United States Patent
Karasaridis (10) Patent No.: US 8,910,280 B2
(45) Date of Patent: Dec. 9, 2014

(54) DETECTING AND BLOCKING DOMAIN NAME SYSTEM CACHE POISONING ATTACKS

(75) Inventor: Anestis Karasaridis, Oceanport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 74 days.

(21) Appl. No.: 13/460,110

(22) Filed: Apr. 30, 2012

(65) Prior Publication Data

US 2013/0291101 A1 Oct. 31, 2013

(51) Int. Cl.
*G06F 21/00* (2013.01)
*H04L 29/06* (2006.01)
*G06F 21/57* (2013.01)

(52) U.S. Cl.
CPC ............ *G06F 21/00* (2013.01); *H04L 63/1425* (2013.01); *G06F 21/577* (2013.01)
USPC .................. 726/22; 726/23; 726/24; 709/224

(58) Field of Classification Search
CPC ... G06F 21/00; G06F 21/577; G06F 2221/03; G06F 2221/21; H04L 63/1425; H04L 63/14; H04L 63/1408
USPC ........................................ 726/23, 24; 709/224
See application file for complete search history.

(56) References Cited

U.S. PATENT DOCUMENTS

| 7,930,428 | B2 | 4/2011 | Drako | |
| 8,707,429 | B2* | 4/2014 | Wilbourn et al. | 726/22 |
| 2009/0077373 | A1* | 3/2009 | Kramer | 713/155 |
| 2010/0077462 | A1* | 3/2010 | Joffe et al. | 726/5 |
| 2010/0121981 | A1* | 5/2010 | Drako | 709/245 |
| 2011/0035784 | A1 | 2/2011 | Jakobsson | |
| 2012/0124087 | A1* | 5/2012 | Malan et al. | 707/770 |
| 2012/0180125 | A1* | 7/2012 | Sun et al. | 726/22 |
| 2014/0157405 | A1* | 6/2014 | Joll et al. | 726/22 |
| 2014/0208423 | A1* | 7/2014 | Ma | 726/22 |

FOREIGN PATENT DOCUMENTS

WO WO 2010115913 A2 * 10/2010

OTHER PUBLICATIONS

Bernstein, D.J., "Notes on the Domain Name System," [cr.yp.to/djbdns/notes.html#poison] Accessed Apr. 24, 2012.
DNSSEC—The DNS Security Extensions—Protocol Home Page "DNSSEC: The DNS Security Extensions, Securing the Domain Name System," [www.dnssec.net] Accessed Apr. 24, 2012.
Wikipedia, "Domain Name System Security Extensions," [en.wikipedia.org/wiki/Domain_Name_System_Security_Extensions] Accessed Apr. 24, 2012.

* cited by examiner

*Primary Examiner* — Christopher Revak
*Assistant Examiner* — Sarah Su
(74) *Attorney, Agent, or Firm* — Hartman & Citrin LLC (57) ABSTRACT

Concepts and technologies for detecting and blocking Domain Name System ("DNS") cache poisoning attacks are provided. An inline detector and blocker apparatus implements a detection algorithm to monitor DNS response packets and detects a DNS cache poisoning attack utilizing the detection algorithm. The inline detector and blocker apparatus detects the DNS cache poisoning attack by receiving a DNS response packet and determining that the response packet includes poison data. The poison data may be included within an additional section of the response packet and/or an answer section of the response packet. As appropriate, the inline detector and blocker apparatus removes the additional section and/or the answer section of the response packet to effectively block the poison data from being cached by a DNS caching resolver.

19 Claims, 7 Drawing Sheets

DETECTING AND BLOCKING DOMAIN NAME SYSTEM CACHE POISONING ATTACKS

TECHNICAL FIELD

The concepts and technologies disclosed herein generally relate to internet security. More particularly, the concepts and technologies disclosed herein relate to detecting and blocking Domain Name System ("DNS") cache poisoning attacks.

BACKGROUND

As the enabler of almost all web, email, instant messaging, and streaming transactions, the DNS is arguably one of the most critical infrastructure services in the Internet. DNS is also the main platform for new and emerging services such as Voice over Long-Term Evolution ("LTE") ("VoLTE") in cellular networks, Voice over Internet Protocol ("IP") ("VoIP") in telephony, Radio Frequency ID ("RFID") technologies, and Content Distribution Networks ("CDNs"). DNS plays a central role in the acquisition and verification of server certificates to allow secure communication over the Internet via SSL/TLS, for example, when connecting with a browser to a banking Web site, or authenticating securely to a login page.

Based on the above, it is essential that DNS is continuously available and operated reliably. In the past several years, there has been an increase in the volume and sophistication of attacks on the Internet infrastructure, including DNS. Online theft has surpassed physical theft, which is an indication of the high value presented by the Internet to criminal organizations. At the same time, companies have the responsibility to protect their customers from illegitimate activities and their capital investments in infrastructure. A major priority in this effort is to protect the DNS service, which is offered to individual and business customers, and supports numerous other services.

When the DNS protocol was initially designed in the early 80's, it was used by a small set of trusted terminals and servers. Today, DNS is used by billions of devices around the globe, and a significant portion of these devices are compromised or operated with malicious intent. Despite this, more than thirty years after the initial design, there still has not been a significant overhaul in the security of the protocol. Domain Name System Security Extensions ("DNSSEC"), a new protocol build on top of the original DNS protocol, is touted by many as the right solution, but the reality is that DNSSEC has its own weaknesses, and introduces many additional risks. For these reasons many DNS operators delay DNSSEC introduction. Evidence to this is the very slow rate of DNSSEC deployments over the last several years.

Due to the weak security of DNS, DNS is amenable to information tampering. This can affect multiple client devices as the tampered information remains persistent in server caches. This is commonly referred as cache poisoning. Client devices may unknowingly use the tampered information and can be denied service or even maliciously get redirected to other servers that may retrieve user credentials, leak information, sell illegal or fake merchandise, or perform some other malicious activity. DNSSEC can theoretically mitigate this problem but introduces many additional risks, such as increased hardware requirements (e.g., network links, routers, larger servers and disks), operational costs, and increased frequency of service outages. DNSSEC is also not the optimum solution for network service providers whose main interest is the protection of end users with minimal impact to their network.

SUMMARY

Concepts and technologies are disclosed herein for detecting and blocking DNS cache poisoning attacks. According to one aspect disclosed herein, a method for detecting and blocking cache poisoning attacks utilizes an inline detecting and blocking apparatus. The method includes collecting, organizing, and analyzing DNS response packets as the DNS response packets travel back to a DNS caching resolver from one or more upstream authoritative DNS servers. In particular, the method includes a detection operation that identifies the signature of the attack and then optionally feeds the signature to a blocking operation that operates inline and modifies packets in real-time as the modified packets pass through, thereby protecting the recursive caching DNS server computer from caching tampered data. The blocking operation has been designed to have no negative impact to legitimate traffic. Moreover, the method does not have any dependencies on DNSSEC.

According to another aspect disclosed herein, an inline detector and blocker apparatus implements a detection algorithm to monitor DNS response packets and detects a DNS cache poisoning attack utilizing the detection algorithm. The inline detector and blocker apparatus detects the DNS cache poisoning attack by receiving a DNS response packet and determining that the response packet includes poison data. The poison data may be included within an additional section of the response packet and/or an answer section of the response packet. As appropriate, the inline detector and blocker apparatus removes the additional section and/or the answer section of the response packet to effectively block the poison data from being cached by a DNS caching resolver.

It should be appreciated that the above-described subject matter may be implemented, for example, as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein mitigate the problem of cache poisoning attacks in DNS making transactions on the Internet safer and more reliable. Cache poisoning can still be performed today, even on servers that run the latest versions of DNS software, independent of the vendor since it exploits a protocol weakness rather than an implementation fault. Cache poisoning can lead to significant disruptions in the Internet, which can lead to severe financial losses, as a large portion of commerce, entertainment and communications is moved to the Internet. DNSSEC is touted by some as the solution to DNS cache poisoning, however widespread DNSSEC deployment is not possible today. To have a zone (i.e., a set of DNS data) properly signed and authenticated, all parent zones need to be DNSSEC enabled. Today, only few top-level domains are signed. In addition, most registrars (i.e., companies responsible for the registration of new domains and for managing the registration information of existing domains) do not provide the capability to introduce DNSSEC records required to establish chain of trust with the parent zone. Currently, new DNSSEC deployments are few and cover only a small fraction of all zones in the Internet.

DNSSEC is optional. A zone operator may not choose to deploy DNSSEC for various reasons. This shifts the responsibility of maintaining accurate DNS information to the network providers. If more zones use DNSSEC, it increases the impact on the network and servers. Traffic will increase and servers will need to perform more computations to verify signatures of all DNS records.

DNSSEC increases the risk of amplification attacks. Since response packets are much larger than request packets, and since the source addresses of requests can be easily spoofed, an adversary could amplify trivially a Denial of Service attack by almost two orders of magnitude. In fact, it has been observed that DNSSEC zones are preferred (9 of the top 10 zones) in launching such attacks compared to regular DNS zones.

The concepts and technologies disclosed herein for detecting and blocking DNS cache poisoning attacks obviates the need to implement DNSSEC on all domains in the Internet, which is a major undertaking Since DNSSEC is a voluntary choice made by content providers and zone operators, a network service provider cannot ensure that all domains queried by its end users are protected. The concepts and technologies disclosed herein provide protection to all domains regardless of whether or not they implement DNSSEC. The concepts and technologies disclosed herein therefore alleviate the burden of content providers and zone operators from deploying and managing DNS SEC.

An additional benefit of the concepts and technologies disclosed herein is that, the additional costs and risks introduced by the widespread implementation of DNSSEC can be significantly controlled. Service providers can save millions of dollars in additional equipment such as network links, increased capacity routers, more and larger servers, and more personnel to manage and monitor DNSSEC, and will have fewer outages due to incorrect management of DNS SEC by the zone operators.

Moreover, the concepts and technologies disclosed herein reduce the impact of amplification attacks, which use DNSSEC. Amplification attacks lead to denial of service, which, in turn, leads to hundreds of millions of losses to businesses every year. Zones that have implemented DNS SEC are highly preferred by attackers to launch such attacks.

The concepts and technologies disclosed herein also have many long-term benefits. Even if all risks of DNSSEC are contained it will take several years until all domains are secured by their zone operators. The concepts and technologies disclosed herein can be quickly implemented by the operators of caching resolvers, such as network access providers, and can provide protection against cache poisoning immediately for all domains used by end-users.

Some of the concepts and technologies disclosed herein are observable using black box testing. The input is generated by an apparatus that is configured to generate DNS response packets. The black box is a detector and blocker apparatus. The output of the detector and blocker apparatus is DNS packets, which may be modified. The input packets are generated with query names ("QNAMEs") in the form <random_string>.example.com and random transaction IDs ("TXIDs") and destination ports ("DPORTs"). Response packets have an additional section with a resource name ("RNAME") and resource data ("RDATA") combination that does not exist in DNS. The rates of the responses and the rate of unique QNAMES may be varied. The rates of TXIDs and DPORTs per QNAME may also be varied. The output is also observed if the output DNS response packets are modified versions of the input. Specifically, output DNS response packets may be analyzed to determine if the additional section is modified or if the response packets are modified to report an error.

With a new effective cache poisoning attack method being public since 2008, caching servers—even though better protected today—are still vulnerable. No other changes to the protocol are addressing the issue of cache poisoning due mostly to the anticipation that the problem will be resolved with DNS SEC. Many companies are currently considering deployments of DNS SEC and evaluating the risks and the overall cost for deployment and managing the service. This process will continue for the foreseeable future unless there are alternatives. The concepts and technologies disclosed herein come at the right time as an alternative or complementary technology, and will provide significant relief to end users, network providers, zone operators, and content providers, among others.

The concepts and technologies disclosed herein apply to the security of DNS. DNS has been around for over thirty years. DNS remains the technology of choice for providing and optimizing new and existing services available online. Extending its initial purpose and functionality, it is the de facto distributed database on the Internet. Such trend is expected to continue in the future due to the continuous innovation, the convergence of technologies, and the rapid deployment of new technologies on the Internet.

The concepts and technologies disclosed herein have the potential to save hundreds of millions of dollars annually due mainly to the following factors: a) It will reduce unnecessary DNS SEC deployments and traffic and, as a result, reduce requirements for network (e.g., links and routers) and server capacity enhancements; and b) reduce the frequency of revenue impacting outages. Revenue can be generated by licensing the technology to other network providers, intrusion detection system ("IDS") manufacturers, and DNS service providers.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for detecting and blocking DNS cache poisoning attacks, among others, will be presented.

Figure 1:
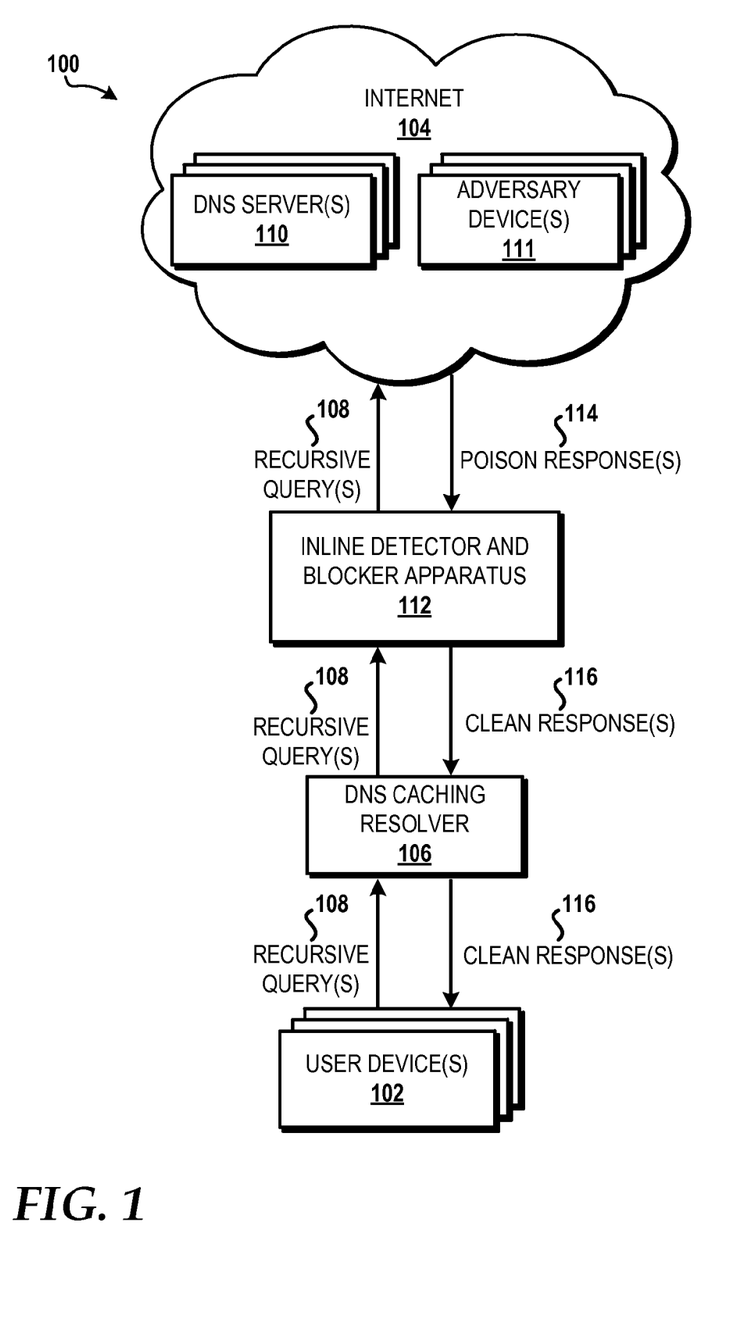
FIG. 1 is a diagram illustrating an illustrative operating environment for implementing various embodiments presented herein.

Referring now to FIG. 1, aspects of an operating environment 100 for various embodiments presented herein will be described. The illustrated operating environment 100 includes one or more user devices 102 (hereinafter generally "user device 102"), each of which may be a mobile device (e.g., a smartphone or other cellular telephone), a personal computer ("PC"), a desktop workstation, a laptop computer, a tablet computer, a notebook computer, an ultraportable computer, a personal digital assistant ("PDA"), an electronic-book reader, a game console, a set-top box, a consumer electronics device, a server computer, or any other type of computing system configured to utilize, at least in part, the DNS protocol. The user device 102 may utilize a Web browser application, an email client application, or some other application (all not shown) in an attempt to access information such as, but not limited to, Web sites, Web pages, email, text, audio, video, games, and streaming content from the Internet 104. This information, in some embodiments, is provided by one or more server computers that may or may not be associated with a cloud service or content distribution network ("CDN"), for example. Moreover, the user device 102 may access the Internet for communication services such as, but not limited to, VoIP, VoLTE, instant messaging, and/or other Internet-based communications.

The user device 102 may access the Internet 104 via a local area network ("LAN") (not shown). The LAN may be a wireless LAN ("WLAN") operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the LAN is implemented utilizing one or more wireless WI-FI access points. In some embodiments, one or more of the wireless WI-FI access points is another computing device that is functioning as a WI-FI hotspot. In some embodiments, the user device 102 connects to the LAN via one or more secure connections each of which may utilize an encryption technology such as, but not limited to, WI-FI Protected Access ("WPA"), WPA2, Wired Equivalent Privacy ("WEP"), or the like. The LAN may alternatively be a wired LAN operating in accordance with one or more wired networking standards such as, but not limited to, IEEE 802.3 ("Ethernet"). In these implementations, the LAN may include any number of routers. In any case, the LAN is in communication with the Internet 104 so as to send and/or receive information, and to facilitate various services, such as those described herein above.

The user device 102 may access the Internet 104 via a wireless wide area network ("WWAN") (also not shown). The WWAN may be a mobile telecommunications network utilizing one or more mobile telecommunications technologies to provide voice and/or data services to the user device 102. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the WWAN may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The WWAN may be configured to provide voice and/or data communications with any combination of the above technologies. The WWAN may be configured to or adapted to provide voice and/or data communications in accordance with future generation technologies. In any case, the WWAN is in communication with the Internet 104 so as to send and/or receive information, and to facilitate various services, such as those described herein above.

It should be understood that the user device 102 may communicate with the Internet 104 via various other methods not described herein. As such, the methods described herein by which the user device 102 may communicate with the Internet 104 should not be construed as being limiting in any way. Moreover, it is contemplated that the user device 102 may be configured to communicate with the Internet 104 via multiple methods and, in some embodiments, may do so simultaneously. For instance, if the user device 102 is a dual-mode device, the user device 102 may communicate with the Internet 104 via WIFI and via LTE.

The user device 102 is illustrated as being in communication with a recursive caching DNS server computer, referred to herein as a DNS caching resolver 106. The DNS caching resolver 106 may be part of a network service provider's network, such as a network provided by a WWAN service provider or an Internet service provider. The DNS caching resolver 106 is configured to initiate and sequence one or more incoming recursive queries 108 (hereinafter generally "recursive query 108") received from the user device 102. The DNS caching resolver 106 is configured to utilize the recursive query 108 to perform a recursive search of the DNS to locate records that would answer the recursive query 108.

The DNS caching resolver 106 performs the recursive search by providing the recursive query 108 to one or more DNS servers 110.

In some embodiments, the DNS servers 110 include one or more root DNS servers. A root DNS server is an authoritative server for the root zone within the hierarchical structure of the DNS system. A root server is a default server that the DNS caching resolver 106 would go to if it does not know the answer to a question asked by a client (e.g., the user device 102) via a query (e.g., the recursive query 108).

In some embodiments, the DNS servers 110 may also include one or more top-level domain ("TLD") authoritative DNS servers. A TLD authoritative DNS server is an authoritative server for the top-level domains, such as .com, .net, .info, .org, and the like. There are currently approximately three hundred top-level domains in the DNS.

In some embodiments, the DNS servers 110 may also include one or more other authoritative DNS servers for other domains that individuals or organizations can register, such as second-level domains ("SLDs") (e.g., example.com). For ease of explanation of the concepts and technologies disclosed herein, the domain example.com will be used hereinafter. It should be understood that the use of this particular domain is used merely for illustrative purposes and should not be construed as being limiting in any way.

In the illustrated embodiment, a DNS cache poisoning attack has been attempted by one or more adversary devices 111 (hereinafter generally "adversary device 111"). A DNS cache poisoning attack works by the adversary device 111 targeting a domain to poison, such as the domain example.com. The adversary device 111 (also referred to as an attacker) invokes a query to the DNS caching resolver 106 for a likely non-existent domain name, such as <random_string>.example.com. Since this domain name is not cached at the DNS caching resolver 106, the DNS caching resolver 106 sends a query to the authoritative DNS server for example.com, such as one of the DNS servers 110. The adversary device 111 then sends as many spoofed responses as possible to the DNS caching resolver 106 in the next X seconds. For instance, the max time window to get a response from a real authoritative server is 100 milliseconds and, as such, the adversary device 111 may send as many spoofed responses as possible to the DNS caching resolver 106 within this time period. Each spoofed response has three sections: 1) an answer section, which provides an answer to the query (e.g., "<random_string>.example.com A 10.20.30.40," which could be a poison); 2) an authority section, which gives the names of the authoritative servers for the queried domain (e.g., "example.com NS ns.example.com"); and 3) an additional section, which gives the IP address of the authoritative server (e.g., "ns.example.com A 10.20.30.100", which could be a poison). In the most effective mode of the attack, the poison is in the additional section, but it is also possible that there is a poison in the answer section. If poisoning was not successful (i.e., the DNS caching resolver 106 did not accept any of the spoofed responses), the adversary device 111 may generate a new <random_string>, attach it to the target domain name, and invoke a new query to the DNS caching resolver 106. The adversary device 111 may repeat this process any number of times in an attempt to poison the example.com domain.

Without the concepts and technologies disclosed herein, if a spoofed response arrives at the DNS caching resolver 106 before the real response from a legit authoritative DNS server and the spoofed response includes a TXID that matches that of the query from the DNS caching resolver 106 to the authoritative server, then a <poison_IP> for ns.example.com will be cached by the DNS caching resolver 106. As a result, subsequent queries by the user device 102 for subdomains of example.com (e.g., www.example.com) to the DNS caching resolver 106 will trigger a query to ns.example.com, which is now mapped to the <poison_IP> in a cache of the DNS caching resolver 106. All subdomains of example.com will be effectively poisoned.

In order to prevent the cache of the DNS caching resolver 106 from being poisoned, an inline detector and blocker ("IDB") apparatus 112 is provided. The IDB apparatus 112 implements a detection algorithm that takes into account the patterns of DNS responses to determine whether or not a DNS cache poisoning attack attempt has been made. In some embodiments, the IDB apparatus 112 is configured to analyze historical and/or current data for an RNAME (domain name) and RDATA (IP address), and the IP registration data of the additional section of DNS responses to confirm a DNS cache poising attack attempt as determined utilizing the detection algorithm.

The term "inline" is used herein to describe a position of a network element in between two points, each of which may contain multiple network elements. In the illustrated embodiment, the IDB apparatus 112 is inline in between a first point (i.e., the Internet 104) and a second point (i.e., the DNS caching resolver 106). More particularly, the Internet 104 is illustrated as including the DNS server 110 and the adversary device 111. As such, the IDB apparatus 112 is effectively inline between the DNS caching resolver 106 and the multiple network elements of the Internet 104. It should be understood that there may be multiple DNS caching resolvers 106. It also should be understood that there may be multiple networks in addition to or as an alternative to the Internet 104. Moreover, there may be other network elements between the first point and the IDB apparatus 112 and/or between the second point and the IDB apparatus 112. For instance, one or more routers, bridges, or switches may be used between the IDB 112 and the DNS server 110.

When an attack is detected, the IDB apparatus 112, in some embodiments, removes the additional section of the response packets for the attacked domain, essentially pruning the packets. In doing so, the corresponding additional records counter ARCOUNT in the header section of the response packets is changed. This has no side effect to the DNS resolution even if the response packet happens to return from the true authoritative server instead of the adversary device 111. By implementing the IDB apparatus 112, poison data will not be allowed to enter the DNS caching resolver 106, thereby preventing the DNS caching resolver 106 from caching poison data.

In the illustrated embodiment, as a result of this attack attempt, the DNS server 110 attempts to provide one or more poison responses 114 (hereinafter generally "poison response 114") to the DNS caching resolver 106. The IDB apparatus 112, however, detects the poison response 114 as including poison data and removes the poison data from the poison response 114, thereby creating one or more clean responses 116 (hereinafter generally "clean response 116"). In some embodiments, a network service provider may desire for one reason or another not to remove the poison data and rely upon the IDB apparatus 112 exclusively for the detection of poison responses. Alternatively, in some embodiments, the network service provider may desire for one reason or another to selectively remove the poison data from poison responses. For instance, the IDB apparatus 112 may remove poison data from some poison responses but allow the poison data to be sent to the user device 102 for other poison responses. In some embodiments, the detection and optionally the removal of poison data is provided as an included service. In other embodiments, the detection and optionally the removal of poison data is provided as a premium service for which a fee may be required.

The IDB apparatus 112, in some embodiments, is configured to execute one or more modules (not shown) in order to provide various services described herein, such as the detection and optional removal of poison data from one or more poison responses. The module(s) may execute on a single IDB apparatus 112 as in the illustrated embodiment, or in parallel across multiple IDB apparatuses 112. In addition, each module may consist of a number of subcomponents executing on different IDB apparatuses 112 or other computing systems or devices within, or in communication with, the IDB apparatus 112. The modules may be implemented as software, hardware, or any combination thereof. The IDB apparatus 112 may be configured utilizing the architecture described herein above with reference to FIG. 5, or some variation thereof.

A method for operating the IDB apparatus 112 to detect and remove poison data from poison responses, such as the poison response 114 is described herein below with reference to FIG. 2. A more detailed method for detecting poison data is described herein below with reference to FIGS. 3A and 3B.

Figure 2:
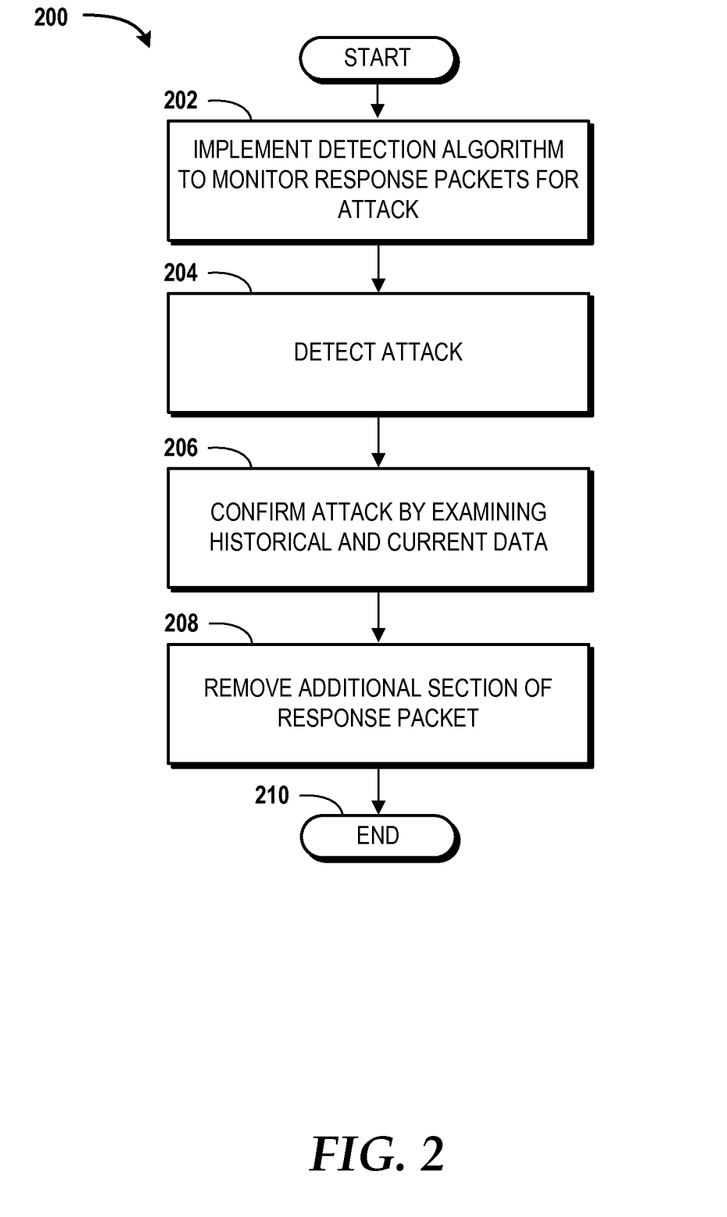
FIG. 2 is a flow diagram showing aspects of a method for detecting and blocking DNS cache poisoning attacks, according to an illustrative embodiment.

Turning now to FIG. 2, a flow diagram showing aspects of a method 200 for detecting and blocking DNS cache poisoning attacks will be described, according to an illustrative embodiment. The method 200 will be described herein with reference to FIG. 1. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. For instance, although the method 200 includes an operation to remove the additional section of a response packet, the method 200 may alternatively omit this operation based upon the needs of a network service provider or for other reasons.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, wireless devices, mobile devices, minicomputers, mainframe computers, personal computers, hand-held computing devices, processor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 begins and proceeds to operation 202, wherein the IDB apparatus 112 implements a detection algorithm to monitor response packets for possible DNS cache poisoning attack activity. The DNS responses may be error responses or non-error responses. Many error responses of a certain SLD, such as example.com, with high variability of subdomains in the question section of the response packets indicate an attack on the SLD. Additional details regarding the detection algorithm are described herein below with reference to FIGS. 3A and 3B.

From operation 202, the method 200 proceeds to operation 204, wherein the IDB apparatus 112 detects an attack. For instance, the IDB apparatus 112 receives a poison response, such as the poison response 114. From operation 204, the method 200 proceeds to operation 206, wherein the IDB apparatus 112 confirms the attack detected at operation 204 by examining historical and current data. For instance, the IDB apparatus 112 may consult one or more reliable sources for historical and current response data. A reliable source may be, for example, a resolver that is located within a company firewall or that is otherwise well-protected and highly unlikely to have been poisoned.

At operation 206, the IDB apparatus 112, in some embodiments, makes the same query for the same name that is being attacked and compares the responses received in response thereto. For instance, if the IDB apparatus 112 suspects that a.example.com was poisoned to the address 10.20.30.40, then the IDB apparatus 112 can make the same query to a reliable resolver and then compare the responses. If the responses are the same, the IDB apparatus 112 may determine that the attack detected at operation 204 was, in fact, not an attack. If, however, the responses are different, this does not necessarily mean that an attack occurred. The responses received may then be compared to historical responses. If the historical and current response data corroborate, then the IDB apparatus 112 may confirm the attack detected at operation 204.

From operation 206, the method 200 proceeds to operation 208, wherein the IDB apparatus 112 removes the additional section of the response packets for the attacked domain, essentially pruning the response packet and changing the corresponding additional records counter ARCOUNT in the header section thereof. This has no side effect to the DNS resolution even if the response packet happens to return from the true authoritative server. This effectively blocks the poison data included in the response packet from being cached by the DNS caching resolver 106.

From operation 208, the method 200 proceeds to operation 210. The method 200 ends at operation 210.

In some embodiments, the attack detected at operation 204 is detected within the answer section of a response packet. In these embodiments, the IDB apparatus 112 may remove the answer section of the response packet and change the error code to RCODE=2 to indicate a server failure. In doing so, the user device 102 that initiated the query to the DNS caching resolver 106 is forced to time-out and to repeat the query.

It should be understood that, in some embodiments, the IDB apparatus 112 does not perform operation 206 to confirm an attack detected at operation 204. It also should be understood that, in some embodiments, the IDB apparatus 112 does not perform operation 208 to remove the additional section of a response packet. The removal of the additional section, however, effectively prevents the cache of the DNS caching resolver 106 from being poisoned.

Figure 3A:
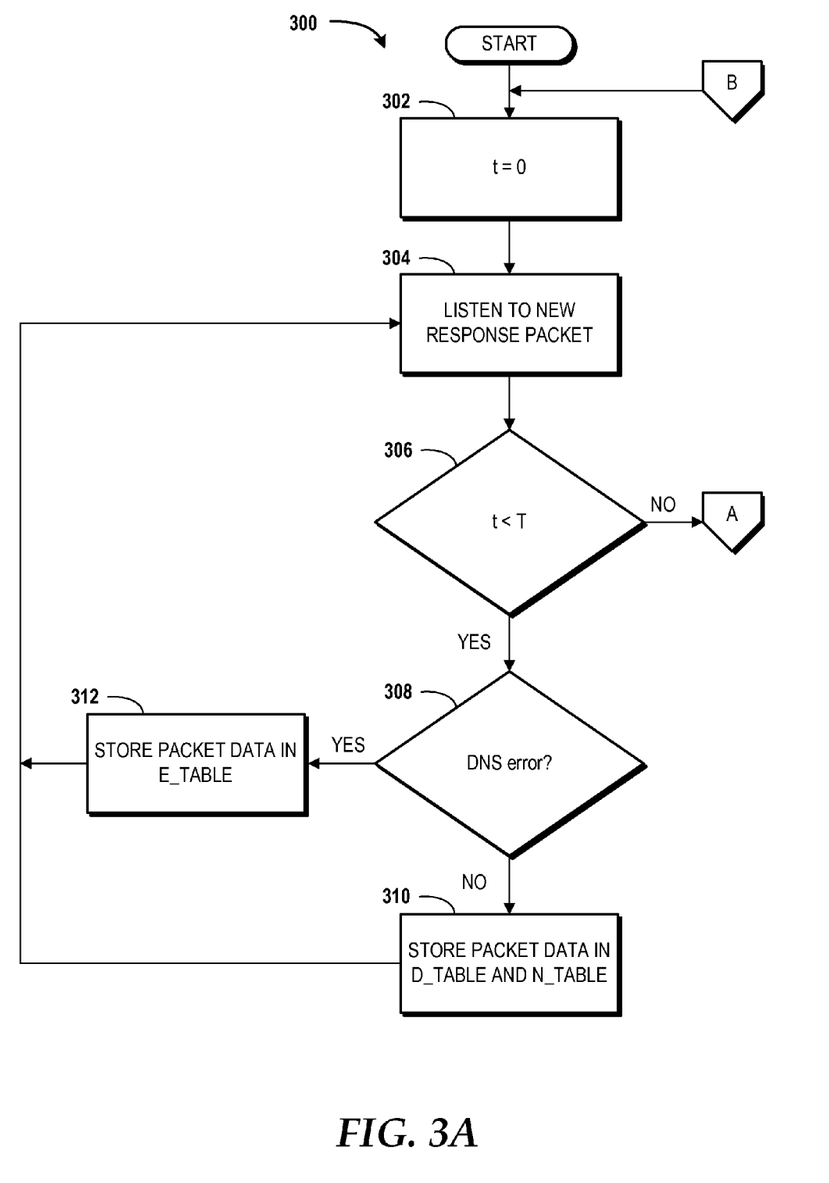
FIGS. 3A and 3B are a flow diagram showing aspects of a method for detecting DNS cache poisoning attacks, according to an illustrative embodiment.
Figure 3B:
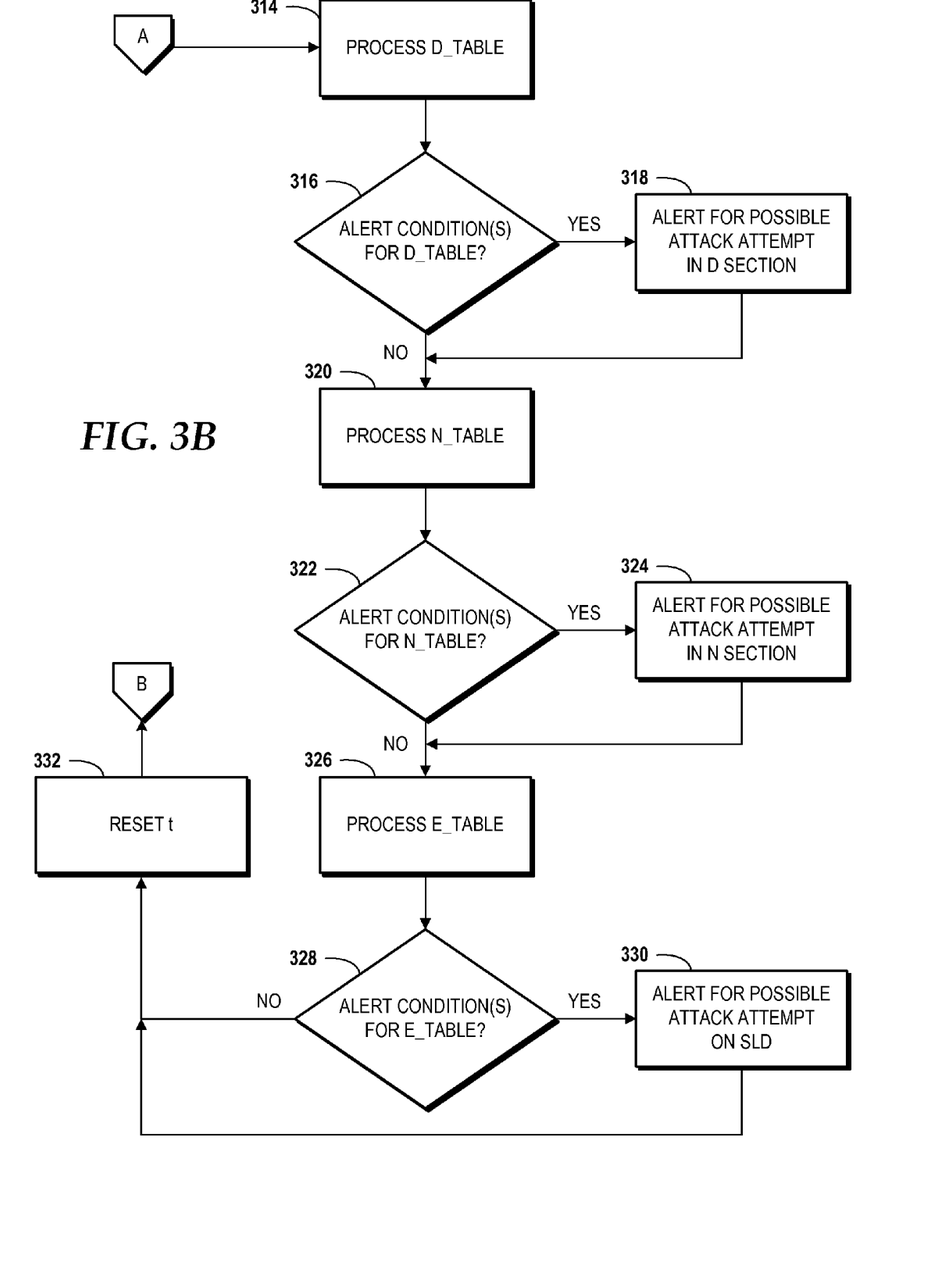

Turning now to FIGS. 3A and 3B, a method 300 for detecting DNS cache poisoning attacks will be described, according to an illustrative embodiment. The method 300 will be described with reference to FIG. 3A first. The method 300 begins and proceeds to operation 302, wherein the IDB apparatus 112 sets time t equal to zero and starts a timer for t. From operation 302, the method 300 proceeds to operation 304, wherein the IDB apparatus 112 listens to a new response packet. The method 300 then proceeds to operation 306, wherein the IDB apparatus 112 determines if the current time t is less than a time window T. The time window T is a time window during which the IDB apparatus 112 stores temporarily certain elements of the response packets in data structures, described in more detail below. If the IDB apparatus 112 determines that the current time t is less than the time window T the method 200 proceeds to operation 308.

At operation 308, the IDB apparatus 112 determines if the response packet includes a DNS error. If the response packet does not include a DNS error, the method 200 proceeds to operation 310. At operation 310, the IDB apparatus 112 stores data associated with the response packet in a D_table and in an N_table. The D_table is configured to store the additional section of the response packet. The N_table is configured to store the answer section of the response packet. As explained above, the additional section is more likely to include poison data and, as such, may be considered to be more critical than the answer section. In some embodiments, the answer section is not considered. In some embodiments, the answer section and/or the additional section may not include any data.

If, at operation 308, the IDB apparatus 112 determines that the response packet includes a DNS error, the method 300 proceeds to operation 312. At operation 312, the IDB apparatus 112 stores data associated with the response packet in an E_table. The error may be a response that has a header and a question section. As such, the data stored in the E_table is extracted from the header and the question section of the response packet. A DNS error response does not include an answer section, an authority section, nor an additional section. This is why an E_table is used separately from the D_table and the N_table.

From operation 310 or from operation 312, the method 300 returns to operation 304, wherein the IDB apparatus 112 listens to a new response packet. This process repeats as long as time t is less than the time window T. When the time t is equal to or greater than the time window T as determined at operation 306, the method 300 proceeds to FIG. 3B and, in particular, operation 314.

At operation 314, the IDB apparatus 112 processes the D_table for particular conditions. For instance, too many names queried for a particular domain (e.g., A.example.com, B.example.com, C.example.com, etc.) may indicate a possible attack. A threshold number of names that are permitted to be queried for a particular domain may be established. For a given name, a number of TXIDs and/or DPORTS in the responses above a threshold may indicate a possible attack. When a server responds, it responds to a particular port. If a request came from port 1000, then the response to that request should come back to the same port. If not, this may indicate a possible attack.

From operation 314, the method 300 proceeds to operation 316, wherein the IDB apparatus 112 determines if one or more alert conditions, such as described above, exist for the D_table. If one or more alert conditions exist, the method 300 proceeds to operation 318, wherein the IDB apparatus 112 provides an alert for a possible attack attempt within the D section. In some embodiments, the alleged attack is confirmed by examining historical and current response data, as described herein above with respect to operation 206 of the method 200. In some embodiments, the alert is logged in some manner for future review. In some embodiments, the alert causes a blocking operation, such as the removal of the additional section from the response packet.

From operation 318, or if the IDB apparatus 112 determines, at operation 316, that no alert conditions exist for the D_table, the method 300 proceeds to operation 320. At operation 320, the IDB apparatus 112 processes the N_table for particular conditions. From operation 320, the method 300 proceeds to operation 322, wherein the IDB apparatus 112 determines if one or more alert conditions exist for the N_table. If one or more alert conditions exist, the method 400 proceeds to operation 324, wherein the IDB apparatus 112 provides an alert for a possible attack attempt within the N section. In some embodiments, the alleged attack is confirmed by examining historical and current response data, as described herein above with respect to operation 206 of the method 200. In some embodiments, the alert is logged in some manner for future review. In some embodiments, the alert causes a blocking operation, such as the removal of the answer section from the response packet.

From operation 324, or if the IDB apparatus 112 determines, at operation 322, that no alert conditions exist for the N_table, the method 300 proceeds to operation 326. At operation 326, the IDB apparatus 112 processes the E_table for particular conditions. From operation 326, the method 300 proceeds to operation 328, wherein the IDB apparatus 112 determines if one or more alert conditions exist for the E_table. If one or more alert conditions exist, the method 300 proceeds to operation 330, wherein the IDB apparatus 112 provides an alert for a possible attack attempt on the SLD.

From operation 330, or if the IDB apparatus 112 determines, at operation 328, that no alert conditions exist for the N_table, the method 300 proceeds to operation 332. At operation 332, the IDB apparatus 112 resets t and returns to operation 302 of FIG. 3A. The method 300 may then repeat any number of times to monitor for potential DNS cache poisoning attacks.

The method 300 has been described in a broad manner. Pseudo-code for implementing the method 300 is provided below and is followed by a detailed description for detecting a cache poisoning attack. It should be understood that the provided pseudo-code should be interpreted as illustrative of but one implementation of the above-described method 300.

```
#PSEUDOCODE FOR DNS CACHE POISONING DETECTION
foreach (files containing dns responses metadata) {#Each file
contains response data for period T
    Empty D_table, N_table, E_table
    for each record { #each record gives info about the question,
answer, additional sections
        if (NO_DNS_ERROR) {
            if (ADDITIONAL_SECTION | ANSWER_SECTION) {
                add record [TS,QNAME,TXID,DPORT] to
D_table or N_table index [CLIP,SVIP,RNAME,RDATA]
            }
        }
        elseif (NXDOMAIN_ERROR) {
            add record [TS,QNAME,TXID,DPORT] to E_table
index [CLIP,SVIP,QNAME-]
        }
    }
    foreach (D_table,N_table,E_table) {
        foreach (sort (indeces) by number of records) {
            caclulate Tg=TSe-TSs and number of records N in table
            index
            next if (N/Tg <THR_r)
            calculate Uq,Ut,Ud
```

```
            if (D_table|E_table) next unless (Uq/Tg>THR_q)
            next unless (Uq/Ut<THR_t | Uq/Ud<THR_t)
            next if dig(RNAME)==RDATA
            next unless (DNS_PASSIVE(RNAME)!=RDATA)
            obtain IP registration data for (RDATA)
            report alarm for likely spoofed mapping between
RNAME and RDATA
        }
      }
}
```

In the above pseudo-code, DNS response data is captured. In some embodiments, the format of the captured DNS response data is individual metadata files that contain response data fields used for detection: Client IP ("CLIP"), Server IP ("SVIP"), Question Name ("QNAME"), Transaction ID ("TXID"), Destination Port ("DPORT"), Error Code ("RCODE"), Resource Record Name ("RNAME"), Resource Record Data ("RDATA") of the additional section of the response, and time stamp ("TS") of the response.

For each individual metadata file which corresponds to particular time interval T, the response data records are grouped (e.g., creating a hash) containing the following elements for a table index ("key") and data: key=(CLIP,SVIP, RNAME,RDATA), data=(TS,QNAME,TXID,DPORT).

If the response contains an error with RCODE=3 (i.e., Non-existent domain error, denoted by NXDOMAIN_ERROR), then key=(CLIP,SVIP,QNAME-), wherein "QNAME-" is the Query Name minus the first label. For instance, if the query name is www.example.com, QNAME- is example.com.

Each group (e.g., key hash) is then sorted by the number of elements N. The time duration of the group Tg is equal to the time period between a start timestamp TSs and an end timestamp TSe (i.e., Tg=TSe−TSs) of the records in the group. If N/Tg is less than a threshold THR_r (i.e., N/Tg<THR_r), then this group is skipped (i.e., the currently examined group is ignored and the next group is examined).

The number of unique QNAMEs Uq, unique TXIDs Ut, and unique DPORT Ud in the data is then calculated. If Uq/Tg is high (e.g., greater than 10 or some other pre-defined threshold) (Note: this condition is not checked for the answer section records), and Uq/Ut or Uq/Ud is low (e.g. less than 1/10 or some other pre-defined threshold), then for error responses, the key elements and the first and last TS in the data elements is returned. For non-error responses, the response data is examined if RDATA is returned from querying DNS for RNAME using one or more trusted DNS (recursive) servers. If there is no match, the response data is examined if the pair does not exist or is rare in passive historical DNS data. If RDATA does not exist or is rare in passive historical DNS data for RNAME, the IP address registration data is obtained for the RDATA. An alert is then generated reporting a suspected attempt to poison RNAME with RDATA, along with information about CLIP, SVIP (such as their IP addresses and DNS names), the start and end times of the attack TSs and TSe, the query names and possibly other relevant data from the group being examined.

Figure 4:
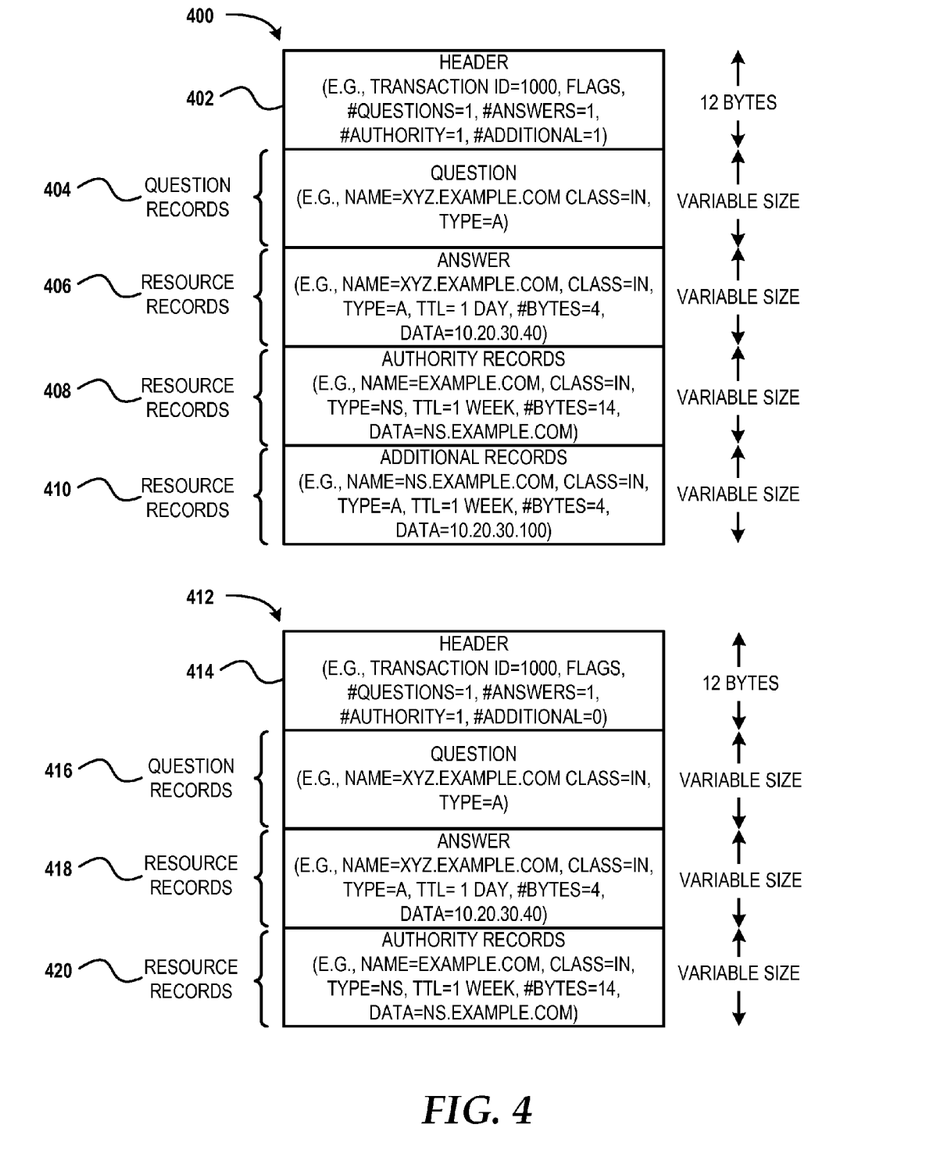
FIG. 4 is a data structure diagram showing aspects of a DNS response packet before and after removing a poisoned section thereof, according to an illustrative embodiment.

Turning now to FIG. 4, a data structure diagram showing aspects of a DNS response packet before and after removing a poisoned section thereof will be described. In the illustrated example, a poisoned DNS response packet 400 includes a header section 402, a question section 404, an answer section 406, an authority section 408, and an additional section 410. Also in the illustrated example, the additional section 410 has been poisoned with a <poison_IP> of 10.20.30.100 to effectively reroute queries from ns.example.com, which has a legitimate IP address of 10.20.30.40 to 10.20.30.100. Using the methods described herein above, the IBD apparatus 112 can remove the additional section 410 from the poisoned DNS response packet 400 to create a clean DNS response packet 412. The clean DNS response packet 412 includes a header section 414, a question section 416, an answer section 418, and an authority section 420. These sections are not modified from the corresponding sections of the poisoned DNS response packet 400. In some embodiments, however, the answer section 406 may be removed if the answer section 406 contains poison data. The clean DNS response packet 412 does not include the additional section 410, which contains the <poison_IP>.

Each of the aforementioned sections includes example data and, as such, should not be construed as being limiting in any way. It should be understood that the type of data illustrated is typical of a DNS packet and will be understood by those skilled in the art.

Figure 5:
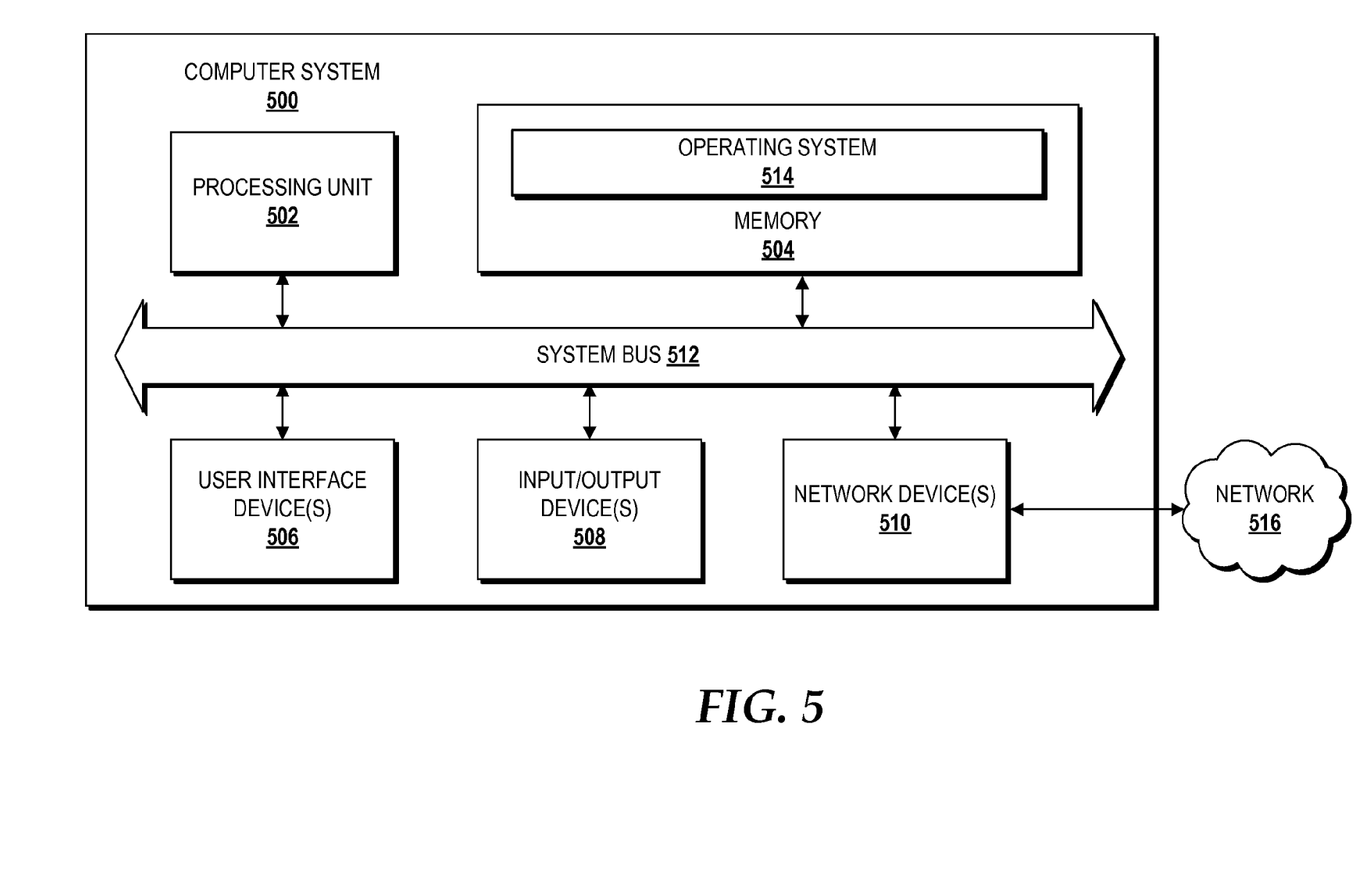
FIG. 5 is a computer architecture diagram illustrating an illustrative computer hardware and software architecture for a computing system capable of implementing aspects of the embodiments presented herein.

FIG. 5 is a block diagram illustrating a computer system 500 configured to perform various operations disclosed herein. The user device(s) 102, the DNS caching resolver 106, the DNS server(s) 110, and/or the IDB apparatus 112 may be configured like the computer system 500. The computer system 500 may include components specific to any of these elements shown in FIG. 1.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer system 500. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514, but may include other operating systems and/or one or more applications.

The operating system 514 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 506 may include one or more devices with which a user accesses the computer system 500. The user interface devices 506 may include, but are not limited to, computers, servers, personal digital assistants, telephones (e.g., cellular, IP, or landline), or any suitable computing devices. The I/O devices 508 enable a user to interface with the program modules. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 516, such the Internet 104 described herein above. Examples of the network devices 510 include, but are not limited to, a modem, a radio frequency ("RF") or infrared ("IR") transceiver, a telephonic interface, a bridge, a router, or a network card. The network 516 may be any of the networks described herein. More generally, the network 516 may include a wireless network such as, but not limited to, a WLAN such as a WI-FI network, a WWAN, a WPAN, or a wireless metropolitan area network ("WMAN"). Alternatively, the network 516 may be a wired network such as, but not limited to, a WAN) such as the Internet, a LAN such as the Ethernet, a PAN, or a wired metropolitan area network ("MAN").

The network 516 embodied as a cellular network may utilize a mobile telecommunications technology such as, but not limited to, GSM, UMTS, CDMA ONE, CDMA2000, LTE, and various other 2G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 516. Therefore, the embodiments presented herein should not be construed as being limited to a particular mobile telecommunications technology and/or standards utilizing such technologies.

As used herein, communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by a user device or computer system, such as one of the user device 104 and/or the data server computer 116 described herein above. For purposes of the claims, the phrase "computer storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

Figure 6:
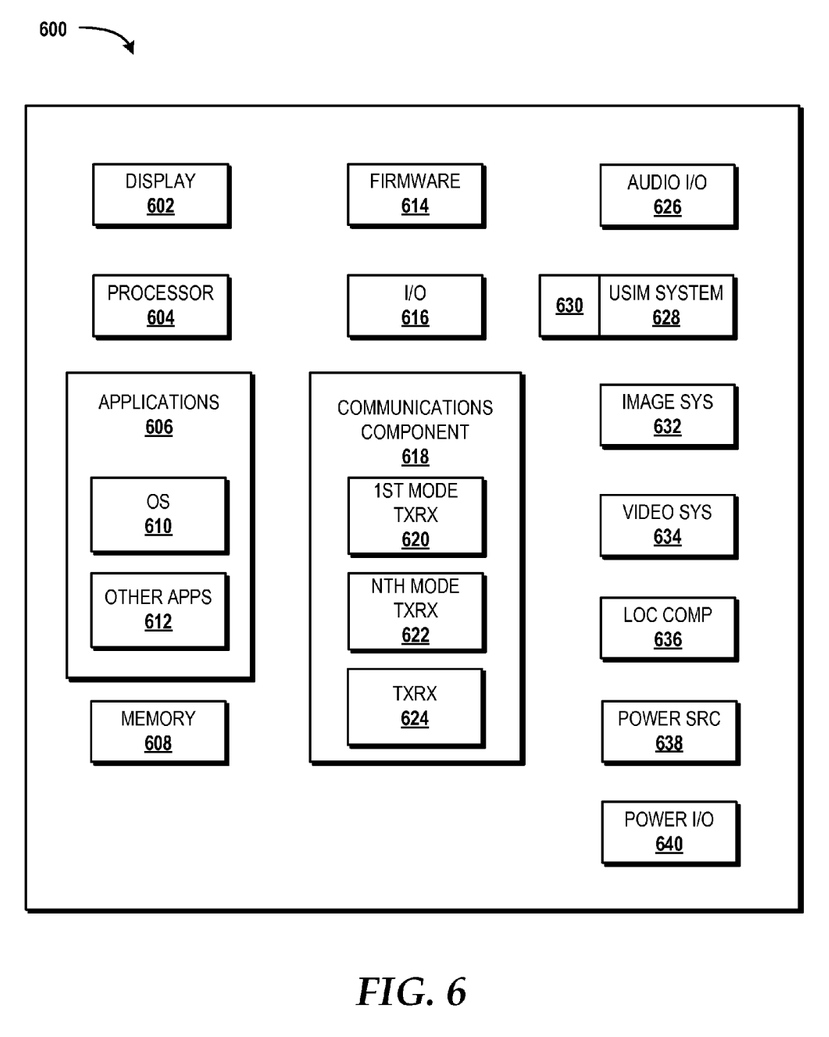
FIG. 6 is a mobile device architecture diagram illustrating an illustrative mobile device hardware and software architecture for a mobile device capable of implementing aspects of the embodiments disclosed herein.

Turning now to FIG. 6, an illustrative mobile device 600 and components thereof will be described. Although connections are not shown between the components illustrated in FIG. 6, the components can interact with each other to carry out device functions. In some embodiments, for example, the components are arranged so as to communicate via one or more busses (not shown). It should be understood that FIG. 6 and the following description are intended to provide a general understanding of a suitable environment in which various aspects of embodiments can be implemented. The user device(s) 102 described herein above may be configured like the mobile device 600. It should be understood that the mobile device may include additional functionality or include less functionality than now described.

As illustrated in FIG. 6, the mobile device 600 includes a display 602 for visually displaying data including, but not limited to, graphical user interface ("GUI") elements, text, images, video, virtual keypads and/or keyboards, messaging data, notification messages, metadata, internet content, device status, time, date, calendar data, device preferences, map and location data, and the like. The mobile device 600 also includes a processor 604 for processing data and/or executing computer-executable instructions of one or more applications 606 stored in a memory 608.

In the illustrated embodiment, the applications 606 include an operating system ("OS") application 610 and other applications 612. In some embodiments, the OS application 610 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

In some embodiments, the other applications 612 include, for example, Web browser applications, messaging applications, text-to-speech and speech-to-text applications, add-ons, plug-ins, e-mail applications, music applications, video applications, camera applications, location-based service applications, navigation applications, power conservation applications, game applications, productivity applications, entertainment applications, enterprise applications, combinations thereof, and the like. The applications 606 or portions thereof are stored in the memory 608 and/or in a firmware 614, and are executed by the processor 604. The firmware 614 may also store code for execution during device power up and power down operations. In some embodiments, the OS 610 or a portion thereof, such as a kernel, is stored in the firmware 614.

The mobile device 600 also includes an input/output ("I/O") interface 616 for the input/output of data such as location information, presence status information, user IDs, passwords, application initiation (start-up) requests, and other input/output of data associated with the embodiments disclosed herein. In some embodiments, the I/O interface 616 is a hardwire connection such as a universal serial bus ("USB"), mini-USB, micro-USB, audio jack, PS2, IEEE 1394, serial, parallel, Ethernet (RJ411) port, RJ11 port, proprietary port, combinations thereof, or the like. In some embodiments, the mobile device 600 is configured to synchronize with another device (e.g., a computer) to transfer content stored to/from the mobile device 600. In some embodiments, the mobile device 600 is configured to receive updates to one or more of the applications 606 via the I/O interface 616. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device instead of, or in addition to, a communications component 618.

The communications component 618 interfaces with the processor 604 to facilitate wireless communications with one or more networks, such as a LAN and/or a WWAN. In some embodiments, the one or more networks include networks that utilize a mobile wireless technology. In some embodiments, one or more networks include networks that utilize non-cellular wireless technologies such as WI-FI or WIMAX. In some embodiments, the communications component 618 includes a multimode communications subsystem for facilitating communications via a cellular network and one or more WI-FI, WIMAX or other non-cellular wireless network.

The communications component 618, in some embodiments, includes one or more transceivers each configured to communicate over the same or a different wireless technology standard. For example, the transceivers of the communications component 618 may be configured to communicate using GSM, CDMAONE, CDMA2000, LTE, and various other 2G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like. In addition, the communications component 618 may facilitate data communications using GPRS, EDGE, the HSPA protocol family including HSDPA, EUL or otherwise termed HSUPA, HSPA+, and various other current and future wireless data access standards.

In the illustrated embodiment, the communications component 618 includes a first cellular transceiver 620 that operates in one mode (e.g., GSM), and an $N^{th}$ cellular transceiver 622 operates in a different mode (e.g., UMTS). While only two cellular transceivers 620, 622 are illustrated, it should be appreciated that more than two transceivers can be included in the communications component 618.

The illustrated communications component 618 also includes an alternative communications transceiver 624 for use by other communications technologies including WI-FI, WIMAX, BLUETOOTH, infrared, IRDA, NFC, other RF, combinations thereof, and the like. In some embodiments, the communications component 618 also facilitates reception from terrestrial radio networks, digital satellite radio networks, internet-based radio service networks, combinations thereof, and the like.

In some embodiments, the communications component 618 processes data from a network such as an internet, the Internet, an intranet, a home broadband network, a WI-FI hotspot, and the like, via an internet service provider ("ISP"), digital subscriber line ("DSL") provider, or broadband provider.

Audio capabilities for the mobile device 600 may be provided by an audio I/O component 626 that includes a speaker for the output of audio signals and a microphone to collect audio signals.

The illustrated mobile device 600 also includes a universal subscriber identity module ("USIM") system 628 that includes a SIM slot interface 630 for accommodating a USIM card. In some embodiments, the USIM system 628 is configured to accept insertion of other SIM cards for access to other network types such as GSM. In other embodiments, the USIM system 628 is configured to accept multiple SIM cards. In still other embodiments, the USIM system 628 is configured to accept a universal integrated circuit card ("UICC") with one or more SIM applications stored thereupon.

The mobile device 600 may also include an image capture and processing system 632 ("image system"). Photos may be obtained via an associated image capture subsystem of the image system 632, for example, a camera. The mobile device 600 may also include a video system 634 for capturing, processing, recording, and/or modifying video content. Photos and videos obtained using the image system 632 and the video system 634, respectively, may be added as message content to a MMS message and sent to another mobile device.

The illustrated mobile device 600 also includes a location component 636 for sending and/or receiving signals such as global positioning system ("GPS") data, assisted-GPS data, WI-FI/WIMAX and/or cellular network triangulation data, combinations thereof, and the like, for determining a location of the mobile device 600. The location component 636 may communicate with the communications component 618 to retrieve triangulation data for determining a location of the mobile device 600. In some embodiments, the location component 636 interfaces with cellular network nodes, telephone lines, satellites, location transmitters and/or beacons, wireless network transmitters and receivers, combinations thereof, and the like. In some embodiments, the location component 636 includes one or more sensors such as a compass, an accelerometer, and/or a gyroscope to determine the orientation of the mobile device 600. Using the location component 636, the mobile device 600 can generate and/or receive data to identify its location, or transmit data used by other devices to determine the location of the mobile device 600. The location component 636 may include multiple components for determining the location and/or orientation of the mobile device 600.

The illustrated mobile device 600 also includes a power source 638, such as one or more batteries and/or other power subsystem (AC or DC). The power source 638 may interface with an external power system or charging equipment via a power I/O component 640.

Based on the foregoing, it should be appreciated that technologies for detecting and blocking DNS cache poisoning attacks have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A method comprising:
monitoring, at an inline apparatus, response packets utilizing a detection algorithm;
detecting, at the inline apparatus, a domain name system cache poisoning attack utilizing the detection algorithm, wherein detecting the domain name system cache poisoning attack comprises
listening to a response packet of the response packets;
determining that the response packet arrives within a time window; and
in response to determining that the response packet arrives within the time window,
determining if the response packet comprises a domain name system error,
in response to determining that the response packet does not comprise the domain name system error, storing data contained within an additional section of the response packet in a first table,
storing data contained within an answer section of the response packet in a second table, and
in response to determining that the response packet comprises the domain name system error, storing data contained within a header section and a question section of the response packet in a third table; and
confirming the domain name system cache poisoning attack by examining historical response data and current response data obtained from a reliable source.

2. The method of claim 1, wherein detecting the domain name system cache poisoning attack comprises:
receiving the response packet from an adversary device; and
determining the response packet comprises poison data.

3. The method of claim 2, further comprising removing a section from the response packet, the section comprising a portion of the poison data.

4. The method of claim 3, further comprising removing the answer section from the response packet, the answer section comprising another portion of the poison data.

5. The method of claim 2, further comprising removing the answer section from the response packet, the answer section comprising a portion of the poison data.

6. The method of claim 1, further comprising:
determining that a further response packet arrives outside the time window; and
in response to determining that the further response packet arrives outside the time window,
processing the first table,
determining if an alert condition for the first table exists,
in response to determining that the alert condition for the first table exists,
alerting for a possible attack attempt in the additional section of the response packet, and
processing the second table,
in response to determining that the alert condition for the first table does not exist, processing the second table,
after processing the second table, determining if an alert condition for the second table exists,
in response to determining that the alert condition for the second table exists,
alerting for a possible attack attempt in the answer section of the response packet, and
processing the third table,
in response to determining that the alert condition for the second table does not exist, processing the third table,
after processing the third table, determining if an alert condition for the third table exists, and
in response to determining that the alert condition for the third table exists, alerting for a possible attack attempt on a particular domain.

7. The method of claim 1 further comprising:
listening to a further response packet of the response packets;
determining that the further response packet arrives within the time window;
in response to determining that the further response packet arrives within the time window,
determining if the further response packet comprises a further domain name system error,
in response to determining that the further response packet does not comprise the further domain name system error,
storing data contained within an additional section of the further response packet in the first table, and
storing data contained within an answer section of the further response packet in the second table, and
in response to determining that the further response packet comprises the further domain name system error, storing data contained within a header section and a question section of the further response packet in the third table; and
determining that another further response packet arrives outside a user-defined time window.

8. The method of claim 7, further comprising:
in response to determining that the another further response packet arrives outside the user-defined time window,
processing the first table,
determining if an alert condition for the first table exists,
in response to determining that the alert condition for the first table exists,
alerting for a possible attack attempt in the additional section of the response packet, and
processing the second table, in response to determining that the alert condition for the first table does not exist, processing the second table, after processing the second table, determining if an alert condition for the second table exists, in response to determining that the alert condition for the second table exists, alerting for a possible attack attempt in the answer section of the response packet, and processing the third table, in response to determining that the alert condition for the second table does not exist, processing the third table, after processing the third table, determining if an alert condition for the third table exists, and in response to determining that the alert condition for the third table exists, alerting for a possible attack attempt on a particular domain.

9. The method of claim 1, wherein the reliable source comprises a resolver located within a company firewall.

10. A computer-readable storage medium comprising computer-executable instructions that, when executed by a computer, cause the computer to perform operations comprising:

monitoring response packets utilizing a detection algorithm;

detecting a domain name system cache poisoning attack utilizing the detection algorithm, wherein detecting the domain name system cache poisoning attack comprises:

listening to a response packet of the response packets, determining that the response packet arrives within a time window, and in response to determining that the response packet arrives within the time window, determining if the response packet comprises a domain name system error, in response to determining that the response packet does not comprise the domain name system error, storing data contained within an additional section of the response packet in a first table, storing data contained within an answer section of the response packet in a second table, and in response to determining that the response packet comprises the domain name system error, storing data contained within a header section and a question section of the response packet in a third table; and confirming the domain name system cache poisoning attack by examining historical response data and current response data obtained from a reliable source.

11. The computer-readable storage medium of claim 10, wherein detecting the domain name system cache poisoning attack comprises:

receiving the response packet from an adversary device; and determining the response packet comprises poison data.

12. The computer-readable storage medium of claim 11, wherein the operations further comprise removing a section from the response packet, the section comprising a portion of the poison data.

13. The computer-readable storage medium of claim 12, wherein the operations further comprise removing the answer section from the response packet, the answer section comprising another portion of the poison data.

14. The computer-readable storage medium of claim 11, wherein the operations further comprise removing the answer section from the response packet, the answer section comprising a portion of the poison data.

15. An apparatus, comprising:

a processor; and a memory storing instructions that, when executed by the processor, cause the processor to perform operations comprising monitoring response packets utilizing a detection algorithm, detecting a domain name system cache poisoning attack utilizing the detection algorithm, wherein detecting the domain name system cache poisoning attack comprises listening to a response packet of the response packets, determining that the response packet arrives within a time window, and in response to determining that the response packet arrives within the time window, determining if the response packet comprises a domain name system error, in response to determining that the response packet does not comprise the domain name system error, storing data contained within an additional section of the response packet in a first table, and storing data contained within an answer section of the response packet in a second table, and in response to determining that the response packet comprises the domain name system error, storing data contained within a header section and a question section of the response packet in a third table; and confirming the domain name system cache poisoning attack by examining historical response data and current response data obtained from a reliable source.

16. The apparatus of claim 15, wherein detecting the domain name system cache poisoning attack comprises:

receiving the response packet from an adversary device; and determining that the response packet comprises poison data.

17. The apparatus of claim 16, wherein the operations further comprise removing a section from the response packet, the section comprising at least a portion of the poison data.

18. The apparatus of claim 17, wherein the operations further comprise removing the answer section from the response packet, the answer section comprising at least another portion of the poison data.

19. The apparatus of claim 16, wherein the operations further comprise removing the answer section from the response packet, the answer section comprising at least a portion of the poison data.

* * * * *